June 7, 1949.　　　　A. L. BAKER　　　　2,472,739
SEALED ADJUSTABLE EYEPIECE FOR OPTICAL INSTRUMENTS Filed Oct. 26, 1945

INVENTOR.
ALLISTER L. BAKER
BY
ATTORNEY

Patented June 7, 1949

2,472,739

UNITED STATES PATENT OFFICE 2,472,739

SEALED ADJUSTABLE EYEPIECE FOR OPTICAL INSTRUMENTS

Allister L. Baker, Jersey City, N. J., assignor to Keuffel & Esser Company, Hoboken, N. J., a corporation of New Jersey Application October 26, 1945, Serial No. 624,853

3 Claims. (Cl. 88—32)

This invention relates to an adjustable eyepiece for optical instruments which is provided with a seal to prevent the passage of air and dirt from without to within the instrument or vice versa.

In optical instruments such as telescopes, binoculars, rangefinders and the like, the continued efficiency of the instrument depends in many cases on preventing the deposition of residue as coatings on the lenses which oftentimes occurs from the atmosphere in which the instrument is used. Efforts have been made from time to time to seal these instruments completely and thereby prevent the flow of air or other gases into and out of the instrument. For some types of instruments this is not difficult but where a focusing eyepiece is involved many problems have arisen and efforts to seal the eyepieces have involved intricate arrangements that were either unusually expensive or made the normal operation of the device difficult.

A construction for a sealed adjustable eyepiece is provided in this invention which is characterized by simplicity and ease of manufacture yet has a high degree of efficiency.

While the invention is described particularly with reference to an eyepiece for a telescope, it will be understood that a similar arrangement could be used in connection with binoculars, rangefinders and other optical instruments.

Figure 1:
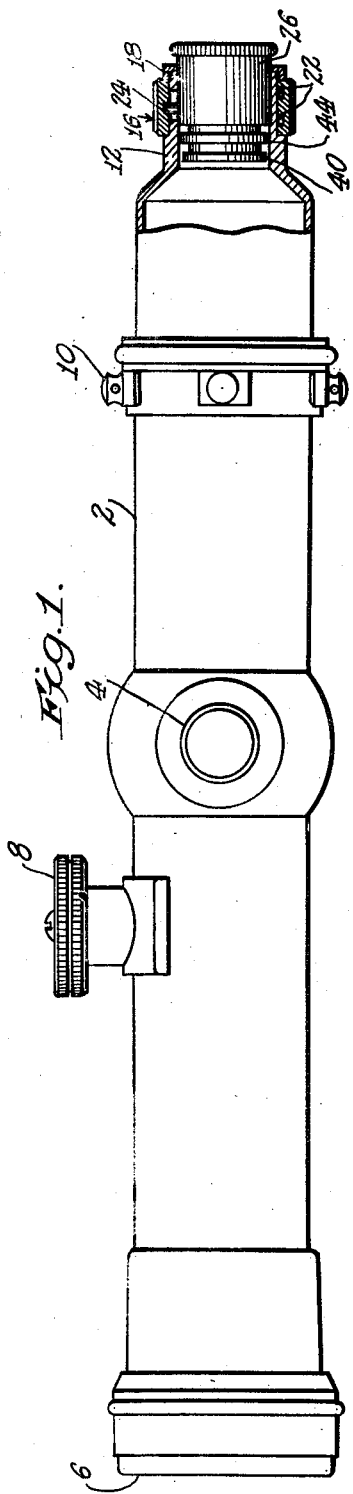
Figure 2:
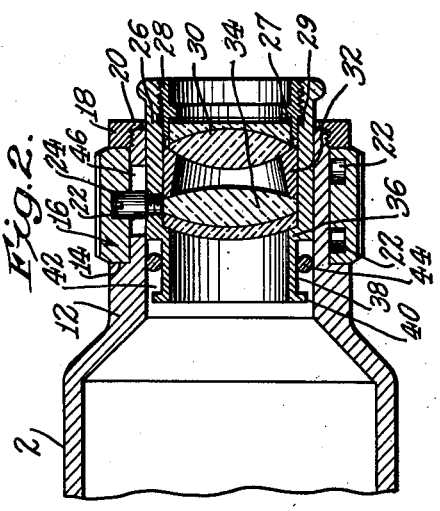

The invention is illustrated in connection with its application to a telescope as shown in the accompanying drawings wherein Figure 1 is a view in plan of a telescope with a portion broken away to show the eyepiece construction in section; and, Figure 2 is an enlarged section through the center of the eyepiece similar to the sectional view of Figure 1.

A telescope 2 of the type generally used in surveying instruments is provided with suitable pivoting axis or axle 4 for changing the angularity of the instrument with respect to the support on which it is mounted. One end of the telescope is provided with a suitable objective lens 6 mounted in any desired manner. Since the objective lens of this type of telescope is not adjustable, a gas-tight seal can be provided very easily. The internal focusing lens, not shown, is subject to adjustment by rotation of the adjusting wheel or focusing knob 8 that is suitably mounted on a shaft with a gas-tight seal.

The reticule mounting and adjusting elements 10 are conventional for telescopes employed in surveying instruments.

The end of the telescope 2 at the eyepiece is generally of reduced diameter and there is provided a cylindrical portion 12. The outer periphery of this cylindrical portion 12 is reduced in diameter as at 14 to receive a focusing ring 16. This focusing ring is held in position by a threaded member 18 which engages a threaded portion of the reduced diameter section 12 of the cylindrical portion of the telescope 2 and this threaded member may be provided with an inwardly projecting flange 20 having an opening of the same diameter as the internal diameter of the cylindrical portion 12.

The inner surface of the focusing ring 16 is provided with a helical cam groove 22 that receives a pin 24. Within the cylindrical portion of the telescope tube 12 is an eyepiece draw tube 26 the outer diameter of which is of such dimension as to make a snug but sliding fit with the inner wall of the cylindrical portion 12. One end of the draw tube 26 is provided with a suitable lens mounting ring 28 which bears against the exit pupil or eye lens 30 of the eyepiece. Sealing gaskets 27 and 29 prevent leakage between the exit pupil lens 30 and the eyepiece draw tube 26. Where the eyepiece comprises several lenses there may be provided one or more spacing rings 32 and eyepiece field lenses 34 one of which would abut against a suitable shoulder 36 within the eyepiece draw tube 26. At the inner end of the eyepiece draw tube 26 is a portion 38 of reduced external diameter which at one end may conveniently be bounded by an outwardly projecting flange 40. This construction provides a cylindrical channel 42. The cylindrical channel 42 is at least about half as long as the distance through which the draw tube will be moved in normal use or operation of the instrument. The radial dimension of the cylindrical channel is relatively small compared to its length.

An annular member or ring 44 that is circular or polygonal in cross section is positioned within this cylindrical channel. The annular member is made of a suitable resilient elastic material as, for example, rubber, though other materials of this general type could be used. In the preferred form the ring is circular in cross section and the surface may be smooth. If desired, ribbing or knurling or other similar roughened surfaces may be used. It is not necessary that the ring be absolutely circular in cross section provided it can roll and retain contact with both opposed surfaces. An elastic resilient member with say eight or more sides could operate readily in the same manner as a member circular in cross section. Where the number of sides is reduced, the pressure exerted by the opposed surfaces on the ring must be increased to maintain the seal and accordingly cross sections approaching circular are preferred. These rings are referred to as polygonal in cross section since there may be a definite number of sides or an infinite number in which case the ring would be circular. The cross sectional diameter of the annular member should be slightly greater than the radial dimension of the cylindrical channel so that it fits snugly against both walls of the channel and prevents the passage of gas, and of course dust, or other abrasive particles, liquids and the like, into the optical instrument.

The pin 24 threaded into the eyepiece draw tube extends through a longitudinal slot 46 in the cylindrical portion of the telescope 2 to engage the helical cam groove 22 of the focusing ring 16.

In operation, with the parts arranged as herein shown, the eyepiece lens may be focused as, for example, on the reticule, or for other purpose, by rotating the focusing ring. Rotation of the focusing ring will cause the helical cam groove 22 to act in one direction or another on the pin 24 which being held in the slot 46 slides the eyepiece draw tube into or out of the instrument. In so doing it moves with respect to the cylindrical portion 12 of the telescope 2 and the annular member 44 is caused to roll within the cylindrical channel 42 and against the outer wall 38 of the draw tube and the inner wall of the cylindrical portion 12 of the telescope tube. In thus rolling against the two elements a gas-tight seal is maintained at all times sufficient to prevent leakage from either the interior of the instrument outwardly or from the outside of the instrument therein due to the pressure differentials which occur in the use of the instrument.

It will thus be seen that this invention provides an eyepiece construction which effectively seals the focusing eyepiece. The invention can be embodied in other forms as will be evident. For example, the eyepiece draw tube could be at least in part external to the telescope and thus by an interchange of parts a cylindrical channel similar to 42 might be formed to receive the sealing ring. The invention is therefore more particularly set forth in the appended claims.

What is claimed is:

1. In an optical instrument having a reticle and an eyepiece, draw tube means having an outside cylindrical surface, means on the instrument adjacent said draw tube means having an inside cylindrical surface spaced from said outside cylindrical surface of said draw tube, said means forming a cylindrical channel between said outside cylindrical surface of said draw tube and said inside cylindrical surface of said instrument, an optical element of said eyepiece mounted in said draw tube means, means for moving said draw tube longitudinally to focus on said reticle, the cylindrical channel being at least one half as long as the maximum movement of the draw tube required for focusing said eyepiece, a resilient elastic annular member in said channel having a substantially circular cross section of a diameter slightly greater than the radial dimension of said cylindrical channel for sealing said instrument and maintaining the seal by rolling in said cylindrical channel when said eyepiece is focused.

2. In a sealed adjustable eyepiece for optical instruments the combination comprising a cylindrical portion on said optical instrument having a focusing ring thereabout, a helical channel in said focusing ring, a pin received in said helical channel, a slot in said cylindrical portion along which the pin may slide upon rotation of the focusing ring, a cylindrical draw tube within said cylindrical portion of said optical instrument, optical elements mounted within said draw tube and provided with means to prevent the passage of gases between said optical elements and draw tube, a portion of said draw tube being of reduced diameter to produce a cylindrical channel between the draw tube and the interior of the cylindrical portion of the optical instrument, said cylindrical channel being at least one-half as long as the path of movement of the draw tube in normal operation of the instrument, said pin being affixed to the draw tube and extending through said slot into said helical channel so as to move the draw tube axially upon rotation of the focusing ring, a resilient elastic annular member in said cylindrical channel having a circular cross section of a diameter slightly greater than the radial dimension of said cylindrical channel whereby upon rotation of said focusing ring the eyepiece draw tube is moved axially within the instrument and the resilient elastic annular member provides a gas tight rolling seal between the draw tube and the cylindrical portion of the optical instrument.

3. In a sealed adjustable eyepiece for optical instruments the combination comprising a cylindrical portion on said optical instrument having a focusing ring thereabout, a cam channel in said focusing ring, a pin in said channel, a slot in said cylindrical portion, a cylindrical draw tube within said cylindrical portion of said optical instrument, an optical element mounted within said draw tube and provided with means to prevent the passage of gases between said optical element and draw tube, a portion of said draw tube of reduced diameter to produce a cylindrical channel between the draw tube and the interior of the cylindrical portion of the optical instrument, said cylindrical channel being at least one-half as long as the path of movement of the draw tube in normal operation of the instrument, said pin being affixed to the draw tube and extending through said slot and into said cam channel so as to move the draw tube axially upon rotation of the focusing ring, a resilient elastic ring in said cylindrical channel having a circular cross section of a diameter slightly greater than the radial dimension of said cylindrical channel whereby upon rotation of said focusing ring the eyepiece draw tube is moved axially within the instrument and the resilient elastic annular member provides a gas tight rolling seal between the draw tube and the cylindrical portion of the optical instrument.

ALLISTER L. BAKER.

REFERENCES CITED

The following references are of record in the file of this patent:

UNITED STATES PATENTS

| Number | Name | Date |
|---|---|---|
| 207,871 | Horton et al. | Sept. 10, 1878 |
| 391,956 | Frager et al. | Oct. 30, 1888 |
| 1,091,933 | Humbrecht | Mar. 31, 1914 |
| 1,127,720 | Lemaire | Feb. 9, 1915 |
| 1,338,241 | Meling et al. | Apr. 27, 1920 |
| 2,362,603 | Wittel | Nov. 14, 1944 |
| 2,364,811 | Perkins | Dec. 12, 1944 |

FOREIGN PATENTS

| Number | Country | Date |
|---|---|---|
| 592,171 | France | Apr. 24, 1925 |